Dec. 15, 1970 G. EMDE 3,548,167

STATIC COUNTER WITH SIMPLIFIED SIGNAL INPUT

Filed March 14, 1968 6 Sheets-Sheet 1

INVENTOR
Günter Emde
by McGlew and Toren
ATTORNEYS

INVENTOR
Günter Emde
by McGlew and Toren
ATTORNEYS

Dec. 15, 1970 G. EMDE 3,548,167

STATIC COUNTER WITH SIMPLIFIED SIGNAL INPUT

Filed March 14, 1968 6 Sheets-Sheet 3

INVENTOR
Günter Emde
by McGlew and Toren
ATTORNEYS

Dec. 15, 1970 G. EMDE 3,548,167

STATIC COUNTER WITH SIMPLIFIED SIGNAL INPUT

Filed March 14, 1968 6 Sheets-Sheet 4

Inventor:
Günter Emde
by McGlew & Toren
Attorneys

STATIC COUNTER WITH SIMPLIFIED SIGNAL INPUT

Filed March 14, 1968 6 Sheets-Sheet 5

Inventor:
Günter Emde
by [signature] Attorneys

Inventor:
Günter Emde
by McGlew & Toren
Attorneys 3,548,167
STATIC COUNTER WITH SIMPLIFIED SIGNAL INPUT Günter Emde, Neubiberg, Germany, assignor to Bolkow Gesellschaft mit beschrankter Haftung, Ottobrunn, near Munich, Germany Filed Mar. 14, 1968, Ser. No. 713,104
Claims priority, application Germany, Mar. 25, 1967, B 91,786
Int. Cl. H03k 21/36, 21/06
U.S. Cl. 235—92 5 Claims

ABSTRACT OF THE DISCLOSURE

A simple logical circuit replaces the input gate circuit and the immediately following input counting stage in a static counter, this logical circuit satisfying the following logical functions of Boole's algebra:

$$Z_0=(A\wedge\overline{B})v(B\wedge\overline{A})$$
$$Z_1=B;$$

where A, $\overline{A}$ and B, $\overline{B}$ are the states of the phase-shifted signals of an increment indicator, for example, and $Z_0$ and $Z_1$ are the output signals of the logical circuit indicating the two lowermost binary digits. The first counting step proper, following the logical circuit, is actuated directly by the natural and inverted phase-shifted signals.

CROSS REFERENCE TO RELATED APPLICATION

The subject matter of the present application is an improvement and simplification of the static counter disclosed in copending U.S. application Ser. No. 634,617, filed Apr. 28, 1967.

BACKGROUND OF THE INVENTION

The disclosure of copending U.S. patent application Ser. No. 634,617 is directed to a static counter for counting forward and backward at any presetting using a plurality of counting steps, each having a pre-storage section and a main storage section, indicating the counting result of a binary digit. This static counter includes an input gate circuit indicating each variation of state of a counting result, and includes counting stages properly connected serially to each other and to this input gate circuit. The second counting stage up to the *n*th counting stage can be actuated by the switching states of the storages of the respective directly preceding counting stages, both as to counting and for the automatic determination of the counting direction. However, the first counting stage connected directly to the output of the input gate circuit, and which is called the input counting stage, is set according to a counting direction signal and the state of the input gate circuit immediately in advance of the input counting stage.

As the input counting stage receives, in addition to the counting signals necessary for setting of this stage, a counting direction signal, its pre-storage section and main storage section are supplied with signals in a certain manner. From the combination of the states of these two storage contents, the following counting stage is switched without the latter requiring a counting direction signal, and all of the succeeding counting stages of the static counter work in a similar manner.

This has the advantage that two opposite counting direction signals do not lead to erroneous countings in the higher counting stages of the counter, even with very close succession of the counting direction signals, since it is only necessary to set the input counting stage correctly in order to take into account a new counting direction. The counting stages following the input counting stage are stepped up, indepedently of any change in the counting direction in the input counting stage, only in accordance with the storage contents of the respective immediately preceding counting stage. The static counter of application Ser. No. 634,617 is actuated by pulse sequences derived from the phase-shifted output signals of a so-called increment-indicator. Digital position indicators, designed as increment-indicators, are used, for example, to indicate a rotary movement by emitting a certain increment sequence and operate, for example, with segments staggered by a quarter cycle so that two pulse sequences, which are phase-shifted by a quarter of a cycle, can be tapped at the output of the increment indicator.

Using a logical network, such as described in copending U.S. patent application Ser. No. 618,834, filed Feb. 27, 1967, these two pulse sequences are so evaluated that separate pulse sequences are formed in dependence on the direction of a movement transformed by the increment-indicator into electric pulses. The high resolving power attained by the increment-indicator having the staggered segments is maintained.

In order to be able to effect a 0 setting, or any selectable presetting of the static counter of application Ser. No. 634,617, the gate circuit and the input counting stage, which latter differs from the other counting stages, are designed in a certain manner requiring a large number of individual elements in order to insure a trouble-free operation and to provide for 0 setting or selectable presetting of the static counter.

For certain uses in space travel, for example when using such a static counter in satellites, 0 setting or other presetting of the counter are not necessary, since such a 0 setting or other presetting can be effected by equivalent measures from units already installed in the satellite for other purposes. Thus, for example, a central board computer is provided in many satellites, and has a capacity so large that it can also simulate a 0 setting or other presetting of such a static counter by varying, for example, a stored value which serves as a 0 reference of the static counter. Since the number of structural elements must be maintained as small as possible, particularly in space travel, for reasons of weight and reliability, it is desirable to simplify a static counter of the type disclosed in application Ser. No. 634,617 as far as possible insofar as the mode of operation and the number of circuits is concerned.

SUMMARY OF THE INVENTION

This invention relates to static counters for forward and backward counting and, more particularly, to an improved and simplified static counter of the type including a plurality of counting stages each having a pre-storage section and a main storage section indicating the counting result of a binary digit.

In accordance with the invention, a static counter of the type disclosed in application Ser. No. 634,617 is simplified by eliminating therefrom the means for a 0 setting or selected pre-setting of the counter. This is effected by tapping the two lowest binary digits from a logical circuit arranged in advance of the counting stages proper and which can be actuated directly by the counter-controlling phase-shifted signals. This logical circuit satisfies the following logical functions of Boole's algebra:

$$Z_0=(A\wedge\overline{B})v(B\wedge\overline{A})$$
$$Z_1=B$$

where A, $\overline{A}$ and B, $\overline{B}$ are the states of the phase-shifted signals emitted by an increment indicator, for example, and $Z_0$ and $Z_1$ are the output signals of the logical circuit indicating the two lowest binary digits. The first counting stage proper following the logical circuit is actuated directly by the natural and inverted phase-shifted signals.

This very simple logical circuit replaces the input gate circuit and the following input counting stage in the static counter disclosed in application Ser. No. 634,617. Since this logical circuit, as well as the immediately following first counting stage proper, is actuated directly by the phase-shifted signals emitted, for example, by an increment indicator, a logical network such as disclosed, for example, in copending U.S. Patent application Ser. No. 618,834, and which is necessary to actuate the static counter of copending U.S. application Ser. No. 634,617, is no longer required so that a large part of the structural elements can be eliminated. Only the means for effecting a 0 setting or a pre-selectable presetting of the two lowest binary digits is eliminated by such simplified actuation of the counter, while the 0 setting and selectable pre-setting of the counting stages proper of the counter, and thus of all the higher binary digits, is still possible in the same manner as described in application Ser. No. 634,617.

Naturally, the application of such a simplified actuation of the static counter is not limited to space travel, and the simplified counter of the invention can be used wherever the 0 setting or pre-setting of the two lowest binary digits is not necessary.

An object of the present invention is to provide a simplified multi-stage static counter.

Another object of the invention is to provide a static counter, of a type already disclosed, in which an input gate circuit and the immediately following input counting stage are replaced by a logical circuit.

A further object of the invention is to provide such a static counter in which the first counting stage proper, following the logical circuit, is actuated directly by natural and inverted phase-shifted signals from means, such as an increment-indicator, for example.

Still another object of the invention is to provide such a static counter in which the logical circuit satisfies the following logical functions of Boole's algebra:

$$Z_0=(A\wedge\overline{B})v(B\wedge\overline{A})$$
$$Z_1=B$$

wherein A, $\overline{A}$ and B, $\overline{B}$ are the states of the phase-shifted signal and $Z_0$ and $Z_1$ are the output signals of the logical circuit indicating the two lowest binary digits.

A further object of the invention is to provide a static counter of the type just mentioned which, while particularly adaptable for space travel, can be used wherever 0-setting or selectable pre-setting of the two lowest binary digits is not necessary.

BRIEF DESCRIPTION OF THE DRAWINGS

For an understanding of the principles of the present invention, reference is made to the following description of a typical embodiment thereof as illustrated in the accompanying drawings.

In the drawings.

BRIEF DESCRIPTION OF THE PREFERRED EMBODIMENT

Figure 1:
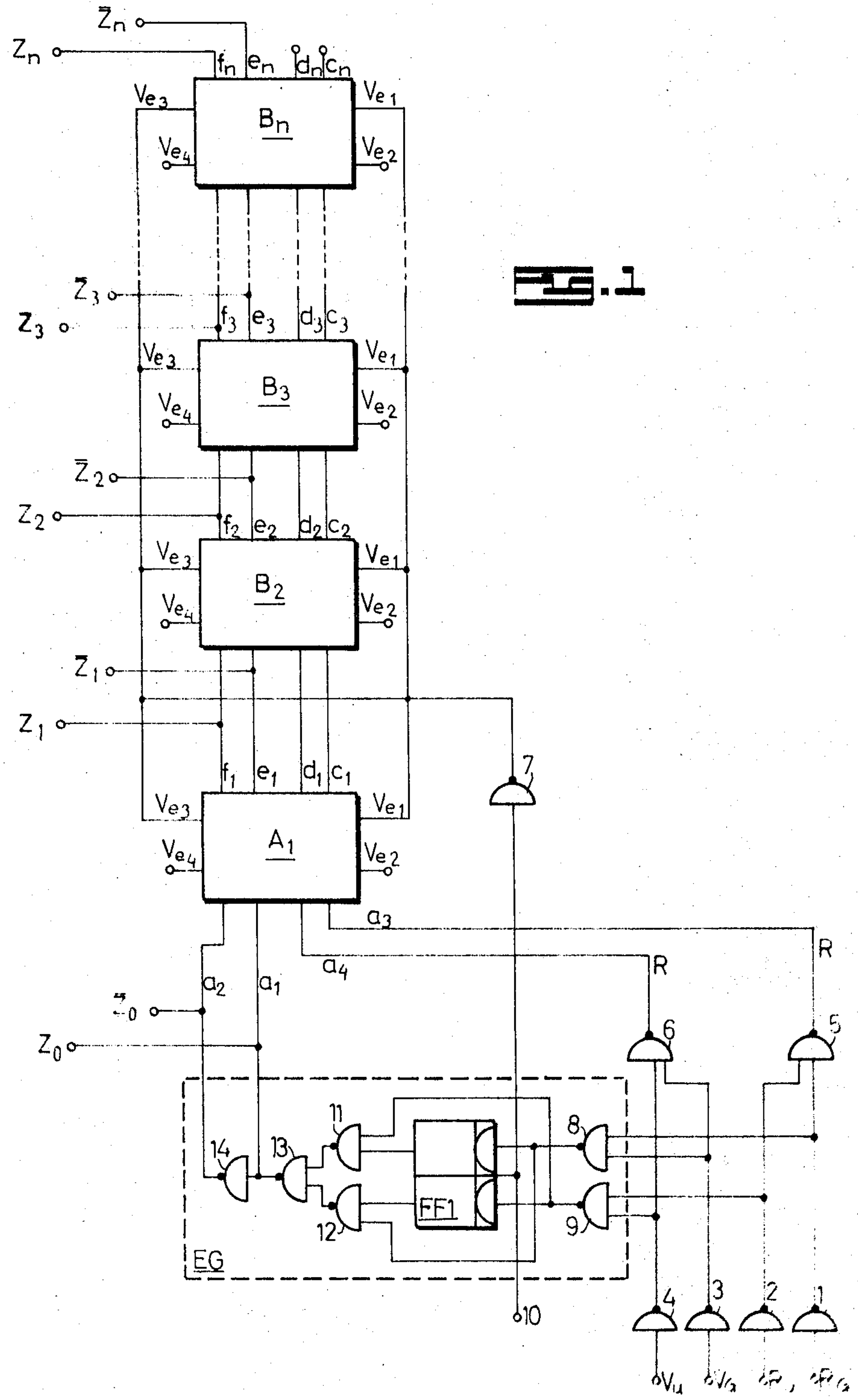
FIG. 1 is a schematic block diagram of the static counter disclosed in copending U.S. application Ser. No. 634,617.

FIG. 1 of the drawings is a duplicate of FIG. 1 of copending patent application Ser. No. 634,617, and illustrates the static counter of the latter in block form. In the static counter illustrated in FIG. 1, input signals are available from a logical network which has not been shown.

These input signals are available at the NAND members 1, 2, 3 and 4, and are separated according to counting direction. The static counter comprises an input gate circuit EG an input counting stage A, and individual additional counting stages B connected behind or about the input counting stage A. The input gage-circuit EG is connected with the four outputs of the NAND members 1, 2, 3 and 4. Also, the outputs of NAND members 1 and 2 are connected as inputs of a NAND member 5, and the outputs of NAND members 3 and 4 are connected with the inputs of a NAND member 6, the output of NAND members 5 and 6 being connected with the counting stage A.

Input gate-circuit EG comprises two input NAND members 8 and 9, a so-called RS flip-flop FF1, and NAND members 11, 12, 13 and 14. The two inputs of NAND member 8 are connected with the outputs of NAND members 1 and 3, and the two inputs of NAND member 9 are connected with the outputs of NAND members 2 and 4. The output of each NAND member 8 and 9 is connected to a respective input of flip-flop FF1. This flip-flop operates in a manner such that the input signals available at its two inputs, which originate from the outputs of NAND members 8 and 9, are transmitted to flip-flop FF1 only when there is also a signal at a zero setting input 10. The two outputs of the double flip-flop FF1 are connected to respective NAND members 11 and 12, the second input of NAND member 11 being connected with the output of NAND member 9 and the second input of NAND member 12 being connected with the output of NAND member 8. The outputs of NAND members 11 and 12 are connected to the inputs of NAND member 13, and the output of NAND member 13 is connected to the input of a NAND member 14. Output $a_1$ of NAND member 13 is also brought out to indicate the value of the lowest and last binary digit $Z_0$, and output $a_2$ of NAND member 14 is brought out to indicate the value $\overline{Z}_0$. A signal at the zero setting input 19 is inverted in NAND member 7 and supplied to two inputs $V_e$ of the various counting stages mentioned hereinafter.

The outputs $a_1$ and $a_2$ of input gate-circuit EG are supplied to the input counting stage A wherein, at the same time, the result of the first or lowest binary digit is available at outputs $Z_0$ and $\overline{Z}_0$. Input counting stage A is connected by lines $S_1$, $d_1$, $e_1$ and $f_1$ with the following or second counting stage $B_2$, and all of the following counting stages $B_3$ to $B_n$ are connected with each other in the same manner as the stage $B_2$ is connected to the stage A.

Two output lines of input counting stage A, namely lines $e_1$ and $f_1$, and two output lines of the other counting stages $B_2$ through $B_n$, namely $e_1$ and $f_1$ are brought out and indicate the counter reading of the respective binary digit of the several counting stages. Input counting stage A and the other counting stages $B_2$ through $B_n$ also have four additional inputs $V_e$ at which the pre-storages and the main storages of each individual counting stage are pre-set at will. Each stage has two of these additional inputs connected with each other and to the output of NAND member 7 in a manner such that they permit the zero setting of the entire counter.

Figure 4:
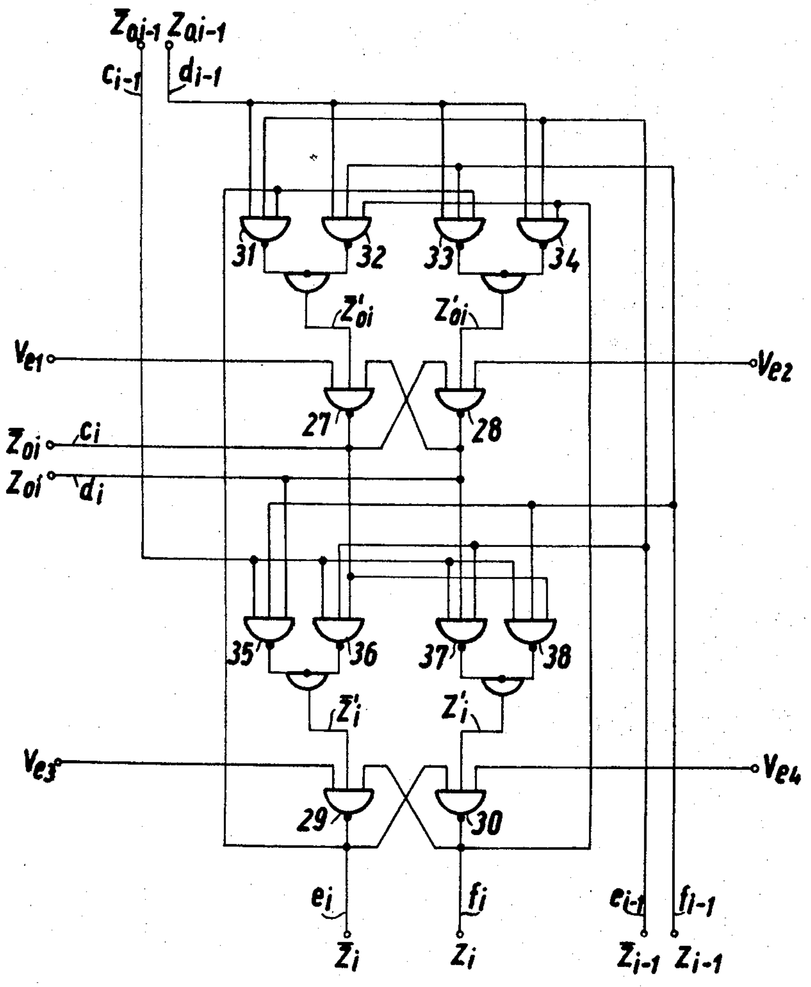
FIG. 4 is a schematic wiring diagram of an input counting stage of the static counter and including NAND members.

Referring to the schematic wiring diagram of FIG. 4, input counting stage A comprises two NAND members 15 and 16 forming the pre-storage thereof and two NAND members 17 and 18 forming the main storage thereof. Input counting stage A has two inputs $a_3$ and $a_4$ for the counting directional signals $\overline{R}$ and R, two inputs $V_{e1}$ and $V_{e2}$ for pre-setting the pre-storage comprising the NAND members 15 and 16, two inputs $V_{e3}$ and $V_{e4}$ for pre-setting the main storage comprising the NAND members 17 and 18 and two inputs which are connected with the outputs $a_1$ and $a_2$ of the input gate-circuit EG and which indicate the respective state $Z_0$ or $\overline{Z}_0$ of the input gate-circuit EG. The outputs of NAND members 15 and 16 are brought out of outputs $c_1$ and $d_1$, and indicate the switching states $Z_{01}$ and $\overline{Z}_{01}$ of the pre-storage. Similarly, the outputs of NAND members 17 and 18 are brought out as outputs $e_1$ and $f_1$ and indicate the switching states $Z_1$ and $\overline{Z}_1$ of the main storage of counting stage A. NAND members 15 and 16 of the pre-storage of counting stage A have inputs supplied through NAND members 19, 20, 21 and 22. Of the three inputs of NAND member 19, one is connected with the counting directional signal input $a_3$, one with the input $a_2$ and one with the output $e_1$ of NAND member 17 of the main storage of counting stage A. Of the three inputs of NAND member 20, one is connected with the counting directional signal input $a_4$, one with the input $a_1$ and one with the output $f_1$ of NAND member 18 of the main storage of counting stage A. The outputs of NAND members 19 and 20 are simply combined in the so-called DL technique used in switching networks, this combination of the output of two NAND members having the logical function of an AND member (wired AND) and the combined outputs are connected with an input of NAND member 15 of the pre-storage of counting stage A.

NAND member 21 also has three inputs, one connected with the counting directional signal $a_4$, one with the input $a_1$, and one with the output $e_1$ of NAND member 17. Similarly, NAND member 22 has one input connected with the counting directional signal input $a_3$, one with input $a_2$ and one with the output $f_1$ of NAND member 18. The outputs of NAND members 21 and 22 are combined in a like manner to the outputs of NAND members 19 and 20, and the combined outputs connected with an input of NAND member 16 of the pre-storage of counting stage A.

NAND member 15 has three inputs, the second of which is connected with an input $V_{e1}$ for pre-setting and the third with the output of NAND member 16. The second input of NAND member 16 is connected with another input $V_{e2}$ for pre-setting and its third input is connected with the output $c_1$ of NAND member 15.

NAND members 17 and 18 of the main storage of counting stage A have their inputs supplied through NAND members 23, 24, 25 and 26. The NAND member 23 has three inputs, one connected with the counting directional signal $a_3$, one with input $a_1$ and one with the output $d_1$ of NAND member 16. NAND member 24 also has three inputs, one connected with the counting direction signal input $a_4$, one with input $a_2$ and one with the output $c_1$ of NAND member 15. In the same manner as previously described, the outputs of NAND members 23 and 24 are combined and connected with one input of NAND members 17.

NAND member 25 has three inputs, one connected with counting direction signal input $a_4$, one with input $a_2$ and one with the output $d_1$ of NAND member 16. NAND member 26 likewise has three inputs, one connected with the counting direction signal input $a_3$, one with input $a_1$ and one with the output $c_1$ of NAND member 15. The outputs of NAND members 25 and 26 are combined in the manner previously described, and connected with one input of NAND member 18.

The second input of NAND member 17 is connected with an input $V_{e3}$ for pre-setting, and its third input is connected with the output of NAND member 18. The second input of NAND member 18 is connected with another input $V_{e4}$ for pre-setting, and its third input with the output of NAND member 17.

In rest position, NAND members 15 and 16 are charged as follows: NAND member 15 receives, over its input $V_{e1}$ and as a rest signal, an "L" signal and, from the combination of the outputs of NAND members 19 and 20, an "O" signal. This is since it is assumed that an "L" signal appears at the counting direction signal input $a_3$ and thus an "O" signal at the input $a_4$, together with an "O" signal at the input $a_1$ and an "L" signal at the input $a_2$, simultaneously with the appearance at the output $e_1$ of NAND member 17 of an "L" signal. NAND member 16 is charged at the input $V_{e2}$ with an "L" signal, and is charged, from the combination of the outputs of NAND members 21 and 22, with an "L" signal, since the output $a_1$ of NAND member 21 carries an "O" signal, the output $a_4$ an "O" signal and the input $e_1$ an "L" signal. The AND condition for NAND member 21 is thus not satisfied. NAND member 22 has its inputs charged with an "O" signal at the input $f_1$, an "L" signal at the input $a_2$ and an "L" signal at the input $a_3$. Thus, the AND condition of NAND member 22 likewise is not satisfied, and an "L" signal consequently appears at the outputs of NAND members 21 and 22 and thus at the input of NAND member 16.

Since the input of NAND member 15 is connected with the combined outputs of NAND members 19 and 20 receives an "O" signal, the AND condition for NAND member 15 is not satisfied and thus an "L" signal appears at its output. The input of NAND member 16 connected with the output of NAND member 15 thus also receives an "L" signal, so that the AND condition of NAND member 16 is satisfied and an "O" signal appears at its output. Since the output of NAND member 16 is also connected with an input of NAND member 15 so that this latter input receives an "O" signal, non-satisfaction of the AND condition for NAND member 15 is assured independently of the other two input signals of this NAND member so long as the AND condition of NAND member 16 is satisfied. The two NAND members 15 and 16 thus replace, in the illustrated wiring, a flip-flop circuit whereby it is positively assured that one output carries the inverted signal of the other output.

Figure 2:
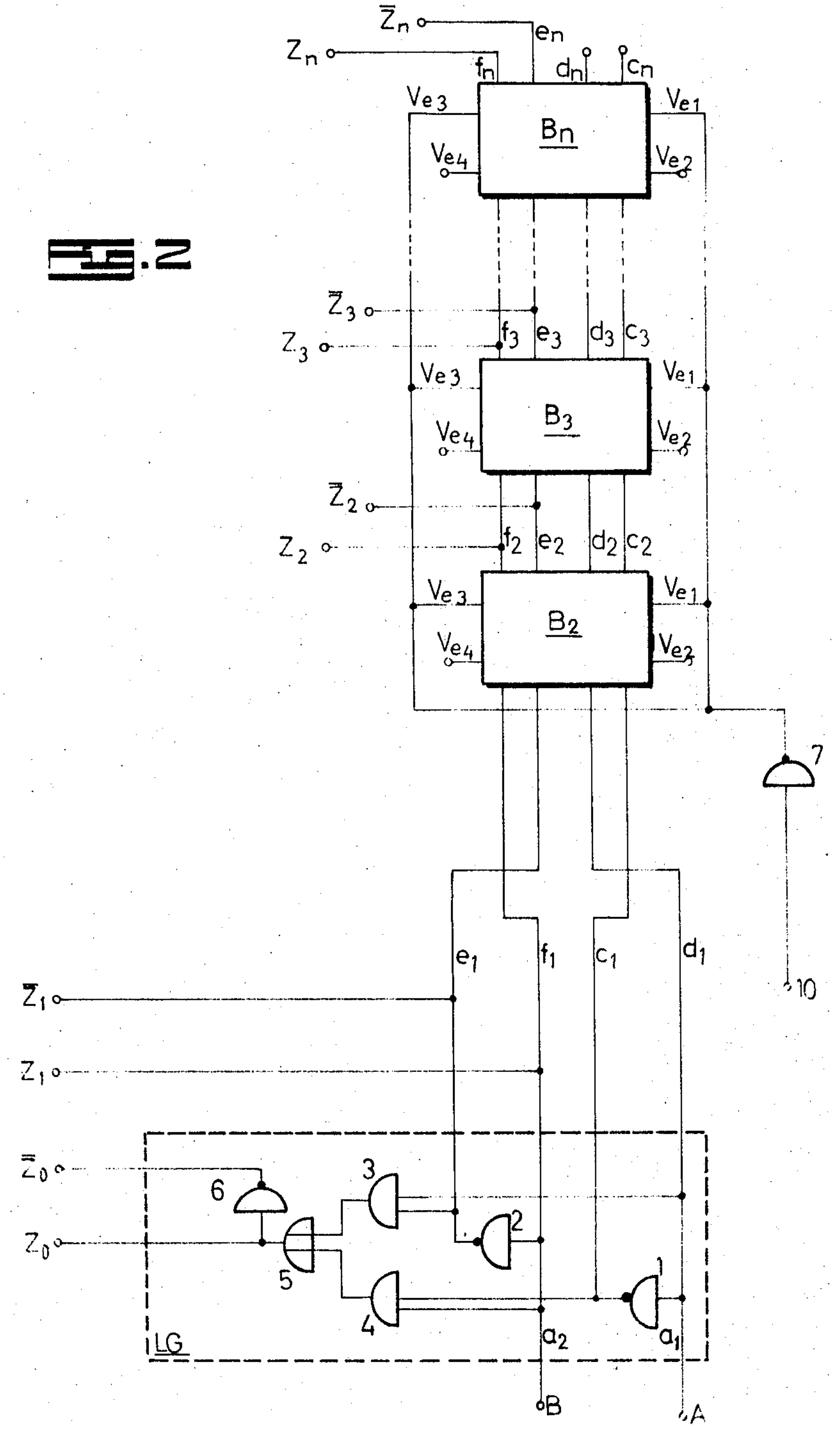
FIG. 2 is a schematic diagram of the static counter shown in FIG. 1 simplified in accordance with the present invention by replacing the input gate circuit and the input counting stage with a logical circuit.

NAND members 17 and 18, forming the main storage of counting stage A, are charged in a similar manner by NAND members 23, 24, 25 and 26 and the inputs of stage A. Thereby, an "O" signal appears, in the rest position, at the output $f_1$ of NAND member 18 and the indicated binary digit of input counting stage A thus is a zero. The interconnection of the individual NAND members of the input counting stage A, as shown in FIG. 2, is so selected that the logical functions, mentioned above for input counting stage A, are satisfied. That is, in forward counting $\overline{R}$, the following carries takes place between the pre-storage and main storage of input counting stage A:

$$\begin{aligned} &\text{If } Z_0=L\text{: } \overline{Z}_1 \rightarrow Z_{01} \\ &\text{if } Z_0=O\text{: } Z_{01} \rightarrow Z_1 \end{aligned} \tag{5}$$

In backward counting R, the following carries take place:

$$\begin{aligned} &\text{If } Z_0=L\text{: } \overline{Z}_{01} \rightarrow Z_1 \\ &\text{if } Z_0=O\text{: } Z_1 \rightarrow Z_{01} \end{aligned} \tag{6}$$

Figure 5:
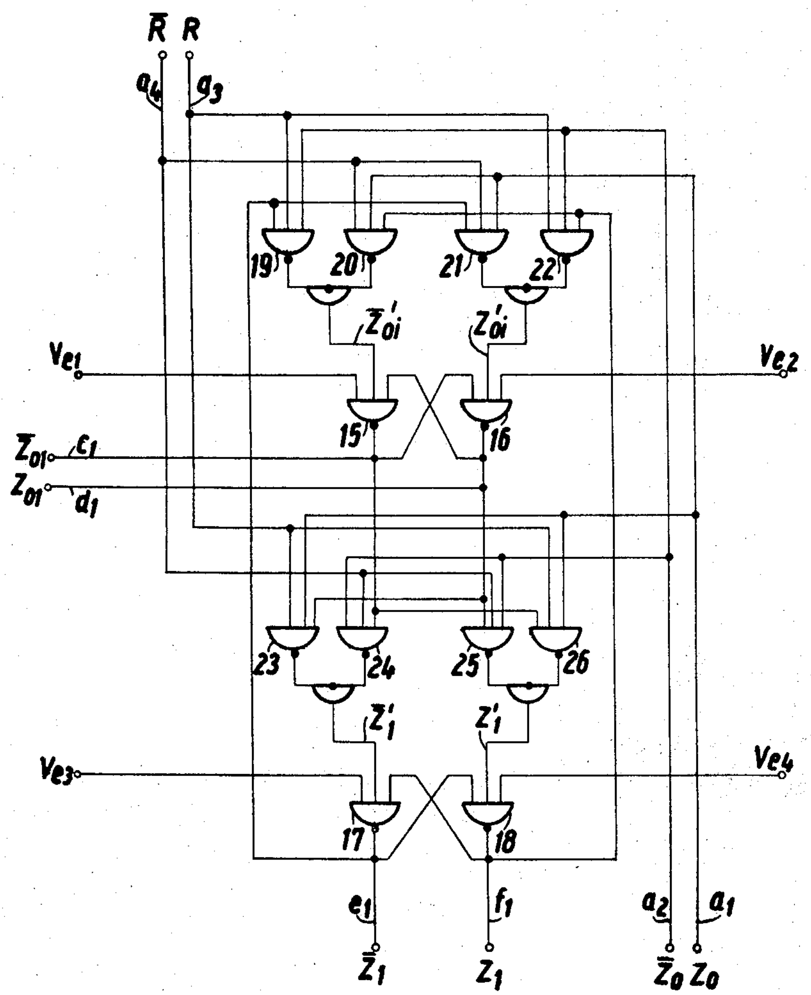
FIG. 5 is a schematic wiring diagram of the counting stages succeeding the input counting stage, and again comprising NAND members.

FIG. 5 shows the internal wiring of the NAND members of one of the identical counting stages B, the individual NAND members being wired with each other in a manner similar to that for input counting stage A and as shown in FIG. 2. A counting stage B likewise has four inputs $V_e$ for pre-setting, two inputs $e_{i-1}$ and $f_{i-1}$ for the states $\overline{Z}_{i-1}$ and $Z_{i-1}$, respectively, of the main storage of the respective preceding counting satge. Instead of the inputs $a_3$ and $a_4$ for the counting direction signals R and $\overline{R}$ provided in input counting stage A, each counting stage B has two inputs $c_{i-1}$ and $d_{i-1}$ at which appear the respective states $\overline{Z}_{0i-1}$ and $Z_{0i-1}$ of the pre-storage of the respective preceding counting stage. Each counting stage B also has four outputs, namely outputs $c_1$ and $d_i$ indicating the respective states $\overline{Z}_{0i}$ and $Z_{0i}$ and $e_1$, $f_i$ which indicate the respective states $\overline{Z}_i$ and $Z_i$ of main storage.

As a pre-storage, each counting stage B has NAND members 27 and 28 which are charged by NAND members 31, 32, 33 and 34, and the main storage includes two NAND members 29 and 30 which are charged from NAND members 35, 36, 37 and 38. The individual NAND members in each counting stage B are interconnected with each other in a manner similar to the interconnection of the NAND members of the input counting stage A as shown in FIG. 4, except that the logical functions applying to each counting stage B, which have already been mentioned, are now satisfied.

In dependence on the states of the pre-storage and the main storage of the respective preceding counting stage, the following carries, between the pre-storage and the main storage of each counting Stage B, takes place:

$$\text{If } Z_{0.i-1}=0 \text{ and } Z_{i-1}=0: Z_{0i} \rightarrow Z_i \quad (7)$$
$$\text{if } Z_{0.i-1}=0 \text{ and } Z_{i-1}=1: \overline{Z}_{0i} \rightarrow Z_i$$
$$\text{if } Z_{0.i-1}=1 \text{ and } Z_{i-1}=0: Z_i \rightarrow Z_{0i}$$
$$\text{if } Z_{0.i-1}=1 \text{ and } Z_{i-1}=1: \overline{Z}_i \rightarrow Z_{0i}$$

Figure 6:
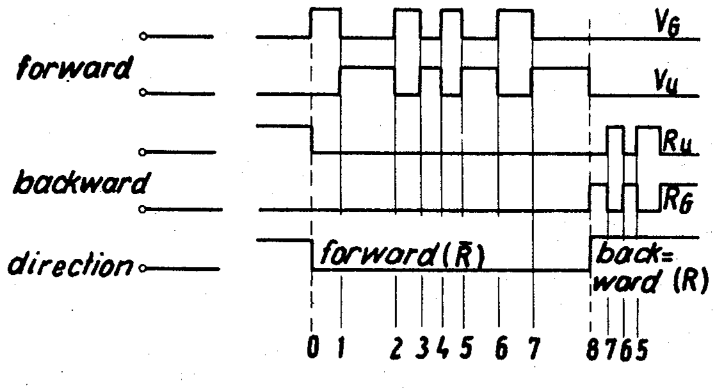
FIG. 6 is a pulse diagram of the input signal available at the input of the counter shown in FIG. 1.

At the input NAND members 1, 2, 3 and 4 of the static counter, there are applied input signals formed by a logical network (not shown) from the signals of an increment indication (not shown) and which are represented in the pulse diagram of FIG. 6. Depending on the direction, pulse sequences appear on the lines $V_G$ and $V_U$ for forward counting and on the lines $R_G$ and $R_U$ for backward counting or movement of the increment indicator. From the two forward movement or counting signals, there is derived, through NAND member 6, a counting direction signal indicating the forward counting direction, and this is applied to the input counting stage A. The backward counting signals are combined by NAND member 5 to form a counting direction signal for backward counting and also applied to input counting stage A. Input counting stage A thus receives the counting directional signals represented in the bottom line of the pulse diagram of FIG. 6.

Let it be assumed that a position indicator (not shown) is in a state of rest before the start of a counting operation, and in a position such that the input of the static counter is so charged, over a logical network (not shown) that an "O" signal appears on line $R_G$, and an "L" signal on line $R_U$, an "O" signal on line $V_G$ and an "O" signal on line $V_U$. With this signal distribution, the AND condition is satisfied for NAND member 8, so that an "O" signal appears at its output and is applied to the input of flip-flop FF1. However, the AND condition is not satisfied for NAND member 9, since there is an "O" signal at the output of NAND member 2. Thus, an "L" signal appears at the output of NAND member 9 and is applied to the other input of flip-flop FF1.

If a counting operation is now to be started, the entire static counter is erased, or re-set to zero, by charging zero setting input 10. Simultaneously, the signal from zero setting input 10 is applied to flip-flop FF1, so that the "L" signal at its input connected to the output of NAND member 9 is stored in the flip-flop and the output of the flip-flop connected with NAND member 12 has an "L" signal appearing thereat. NAND member 11, however, receives an "O" signal from the output of the flip-flop connected thereto, so that an "L" signal always appears at such output and independent of the form of the signal applied to the second input of this NAND member, since the AND condition of NAND member 11 is not satisfied. An "L" signal also appears at the output of NAND member 12, since the second input thereof connected with the output of NAND member 8 receives an "O" signal so that the AND condition for NAND member 12 is thus not satisfied. The AND condition is satisfied, however, for NAND member 13, so that an "O" signal appears at its output $a_1$ and which indicates at the same time the value of the first binary digit $Z_0$. An "L" signal appears at the output $a_2$ of the single input NAND member 14, since an "O" signal appears at the output of NAND member 13.

If the position indicator is now moved in a forward direction, an "L" signal appears on line $V_G$, while the "L" signal on line $R_U$ disappears, as will be noted from FIG. 6. The appearance of the "O" signal at the output of NAND member 3 has the effect that the AND condition for NAND member 8 is no longer satisfied, and an "L" signal consequently appears at its output. However, the AND condition is now satisfied for NAND member 9, and an "O" signal appears at its output. These signals, which are also supplied to the inputs of flip-flop FF1, are without significance for the outputs of the flip-flop since an input signal can be processed by the flip-flop only in combination with a signal from the zero setting input 10.

NAND member 12 now receives, at its second input connected with the output of NAND member 8, an "L" signal so that the AND condition for NAND member 12 is satisfied and an "O" signal appears at its output and is applied to NAND member 13. However, the AND condition for NAND member 13 is no longer satisfied, so that an "L" signal appears at its output $a_1$ and at the same time for the lowest binary digit $Z_0$. This "L" signal is inverted through NAND member 14, so that an "O" signal appears at the output $a_2$.

These signals emitted by input gate-circuit EG, which simultaneously indicate the counter reading of the lowest binary digit of the counter, arrive at input counting stage A and there effect, with a counting direction signal R, setting of the pre-storage. In a following counting increment, as applied to the input of the counter, input gate-circuit EG changes its switching state in a manner similar to that described in connection with FIG. 1, and thus changes its output signals so that the storage content of the pre-storage is carried into the main storage of counting stage A, according to the logical functions applied to input counting stage A. The switching of the respective counter readings is effected in dependence on the storage contents of input counting stage A or on the storage contents of the respective immediately preceding counting stage B. Starting with a counter reading zero, the carry from one counting stage to the next and between pre-storage and main storage of the respective counting stages will now be described on the basis of the following table for forward and backward counting:

| | | |
|---|---|---|
| OOO | OOOO | =0 |
| OOL | OOOL | =1 |
| OLL | OOLO | =2 |
| OLO | OOLL | =3 |
| LLO | OLOO | =4 |
| LLL | OLOL | =5 |
| LOL | OLLO | =6 |
| LOO | OLLL | =7 |
| LOO | LOOO | =8 |
| LOO | OLLL | =7 |
| LOL | OLLO | =6 |

$$\begin{matrix}\text{LLL}\\ \text{OLOL}\end{matrix}=5$$

| $B_3$ | $B_2$ | A | EG |
|---|---|---|---|
| $Z_{03}$ | $Z_{02}$ | $Z_{01}$ | |
| $Z_3$ | $Z_2$ | $Z_1$ | $Z_0$ |

For each digit, the upper line indicates the storage contents of the pre-storage of the respective counting stage, and the bottom line the storage contents of the main storage of the respective counting stage. The last and lowest digit in each bottom line indicates the respective output signal $Z_0$ of input gate-circuit EG. In addition to the storage contents of the individual counting stages as represented in two lines, there is also shown the associated decimal equivalent of the respective binary counter reading.

As can be seen, the state of input gate-circuit EG changes, in passing from one counting stage to the other, only by the alternate appearance of an "O" or an "L" signal. From this output signal of input gate-circuit EG, there is formed, under the above-mentioned condition, and in accordance with the respective counting direction, a carry in the following column which indicates the storage contents $Z_{01}$ and $Z_1$ of input counting stage A. The other two columns indicate the storage contents $Z_{02}$ and $Z_2$, and $Z_{03}$ and $Z_3$, respectively, of the following two counting stages B wherein the carries are formed according to the above-mentioned conditions applying to the counting stages B, depending on the storage contents in the input counting stage A.

After the reading of the static counter has reached "8," input counting stage A receives a counting direction signal R, so that the storage contents are now formed, from the state of the input gate-circuit, in accordance with the conditions applying to backward counting. For the carries of the storage contents in counting stages B, nothing is changed since these are still formed according to the same conditions and from the storage contents of the input counting stage A. If the static counter is charged with counting increments in a backward counting beyond the counter reading of zero, the individual counting stages form negative counter readings in accordance with the conditions applying to backward counting. As an example, there is indicated here the storage contents in binary counter readings corresponding to negative decimal numbers, where the highest stage $B_n$ can be considered as the carrier of the sign:

$$\begin{matrix}\text{OLO}\\ \text{LLOO}\end{matrix}=-4 \qquad (8)$$

$$\begin{matrix}\text{OLL}\\ \text{LLOL}\end{matrix}=-3$$

$$\begin{matrix}\text{OOL}\\ \text{LLLO}\end{matrix}=-2$$

$$\begin{matrix}\text{OOO}\\ \text{LLLL}\end{matrix}=-1$$

$$\begin{matrix}\text{OOO}\\ \text{OOOO}\end{matrix}=\ 0$$

FIG. 2 illustrates a static counter embodying the invention and actuated in a simplified manner, the counting stages proper $B_2$, $B_3$ . . . $B_n$ being designed in the same manner, and connected with each other in the same manner, as in the static counter shown in FIG. 1. The actuation of the counting stages, and the output of the two lowest binary digits, is effected by a logical circuit LG. Logical circuit LG has inputs to which are directly applied the output signals A and B originating from an increment-indicator (not shown).

Logical circuit LG includes two first NAND members, 1 and 2, which are so connected with input lines $a_1$ and $a_2$, respectively, that inverted signals $\overline{A}$ and $\overline{B}$, respectively, appear at their outputs with respect to the signals A and B appearing on the input line $a_1$ and $a_2$.

One input of each of two AND members 3 and 4 of logical circuit LG is connected with a respective input line $a_1$ or $a_2$, respectively, directly, and the other input line of each AND member 3 and 4 is connected to a respective input line $a_1$ or $a_2$ through a respective NAND member 1 or 2. The outputs of AND members 3 and 4 are connected, through an OR member 5, to an output $Z_0$ indicating the lowest binary digit. The inverted content of the lowest binary digit can be tapped at another output $\overline{Z}_0$ through a NAND member 6.

An output $Z_1$, indicating the lowest binary digit, is connected directly with input line $a_1$, so that the output signal B of the increment-indicator can be tapped at output $Z_1$. An output $\overline{Z}_1$, indicating the inverted content of the second lowest binary digit, is connected with the output of NAND member 2. In addition, logical circuit LG has output lines $c_1$, $d_1$, $e_1$ and $f_1$ which are connected to inputs of the following first counting stage proper $B_2$. Output line $d_1$ and $f_1$ carry the output signals A and B from the increment indicator, while output lines $c_1$ and $e_1$ carry the inverted signals $\overline{A}$ and $\overline{B}$ of the increment-indicator.

Figure 3:
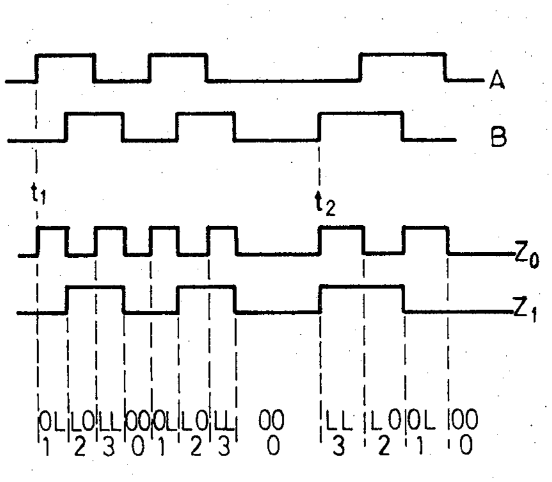
FIG. 3 is a pulse diagram of the signals appearing at the input and at the output of the logical circuit.

The pulse diagram shown in FIG. 3 illustrates the mode of operation of the static counter shown in FIG. 2, and which differs from that of the static counter shown in FIG. 1 and disclosed in application Ser. No. 634,617. The output signals A and B of an increment-indicator, appearing at the input of logical circuit LG effect, through the logic members of circuit LG, the signals appearing at the outputs $Z_0$ and $Z_1$. Beneath the signal pulses representing the binary states appearing at the outputs $Z_0$ and $Z_1$, there are shown the respective lowest two binary digits and the decimal numbers which they indicate.

Starting at the time $t_1$, the counter jumps, upon receipt of the first incoming pulse flank, to the counter setting "1," at the second incoming pulse flank, to the counter setting "2," at the third incoming pulse flank, to the counter setting "3," and at the fourth incoming pulse flank, to the counter setting "0." This last counter setting, indicated by the two lowest binary digits, means, however, a total counter reading of "4" since the first counting stage proper $B_2$ indicates an L as the third lowest binary digit as described in detail above and in application Ser. No. 634,617. With the next succeeding sequence of incoming pulse flanks, the counting process, as it appears at the outputs $Z_0$ and $Z_1$ indicating the lowest binary digits, starts again, the actual counter settings, which result from the additional consideration of the output signals appearing in the following counting stages, being neglected. At the time $t_2$, backward counting is signaled by the correlation of the signals A and B from the increment-indicator, it being noted that the leading flank of the signal B is in advance of the leading flank or rising flank of the signal A. Thereby counter settings appear at the outputs of the additional counting stages $B_2$, $B_3$ . . . $B_n$, which are not taken into consideration here, which are formed by subtraction of the incoming counting increments. The first pulse flank arriving at time $t_2$ therefore effects a counter reading "3" which can be tapped at the outputs $Z_0$ and $Z_1$, that is, actually a counter reading which is a multiple of "4" put out by the following counting stages. With each additional pulse flank arriving after time $t_2$, there appear at the outputs $Z_0$ and $Z_1$ of the logical circuit LG signals which indicate counter readings reduced by an increment.

It will be seen, therefore, that the actuation of the static counter of the invention is considerably simplified by means of a very simple logical circuit, and that the operating reliability is thus increased without the high resolution in the counting of the signals from the increment-indicator being limited. As in the static counter described above and in application Ser. No. 634,617, each pulse flank of the signals emitted by the increment indicator is taken into consideration as a single counting increment, the direction of the counting process being determined automatically from the correlation of the two signals A and B from the increment indicator, one direction being present when the signal A leads the signal B, and the other direction being present when the signal B leads the signal A.

In addition to the advantage of the very simple design and the resulting reduced susceptability to troubles, as compared to the counter described above and in application Ser. No. 634,617, another advantage resides in the increased maximum counting speed of the counter. Since the respective counting direction is already taken into consideration directly at the inputs of logical circuit LG, a collision of a counting increment with a possibly modified counting direction signal of the respective following counting increment is impossible. Such is possible, at high counting speeds, at the input counting step $A_1$ of the static counter of application Ser. No. 634,617, which is shown in FIGS. 1, 4, 5 and 6.

While a specific embodiment of the invention has been shown and described in detail to illustrate the application of the principles of the invention, it will be understood that the invention may be embodied otherwise without departing from such principles.

What is claimed is:

1. A static counter for forward and backward counting comprising, in combination, plurality of substantially identical counting stages each having a pre-storage and a main storage indicating the counting result of a respective binary digit; a logical circuit arranged ahead of the first counting stage and connected to the inputs of the latter; said logical circuit having a pair of inputs receiving a pair of respective phase-shifted counter-controlling signals, the order of appearance of said signals at their respective inputs determining the counting direction; said logical circuit having a pair of outputs providing the two lowest binary digits of the series of binary digits provided by said counter; said logical circuit satisfying the following logical functions of Boole's algebra:

$$Z_0=(A\wedge\overline{B})v(B\wedge\overline{A})$$

$$Z_1=B$$

where A, $\overline{A}$ and B, $\overline{B}$ are th ebinary states of the phase-shifted signals at the respective inputs of said logical circuit, and $Z_0$ and $Z_1$ are the respective signals at the outputs of said logical circuits, indicating the two lowest binary digits; said counting stages being connected serially to each other; and means connecting the storages of each counting stage to inputs of the respective next succeeding counting stage and operable to control the continued counting and the counting direction of such respective next succeeding counting stage in accordance with the switching states of the storages of the respective immediately preceeding counting stage.

2. A static counter, for forward and backward counting, as claimed in claim 1, including means applying directly both the natural and the inverted phase-shifted signals, appearing at the inputs of said logical circuit, to the inputs of said first counting stage.

3. A static counter, for forward and backward counting, as claimed in claim 2, in which said logical circuit has a second pair of outputs providing the inverted two lowest binary digits.

4. A static counter, for forward and backward counting, as claimed in claim 2, in which said logical circuit includes a pair of NAND members each having an input connected to a respective input of said logical circuit; a pair of AND members each having a first input connected to a respective input of said logical circuit and a second input connected to the output of a respective NAND member; and an OR member connected to the outputs of said AND members.

5. A static counter, for forward and backward counting, as claimed in claim 2, including 0-resetting means connected to said counting stages and selectively operable to reset the same to 0.

References Cited

UNITED STATES PATENTS

| | | | |
|---|---|---|---|
| 3,354,295 | 11/1967 | Kulka | 235—92 |
| 3,114,883 | 12/1963 | Arthur | 328—44 |
| 3,443,071 | 5/1969 | Petzold | 235—92 |
| 3,356,953 | 12/1967 | Petzold | 328—44 |
| 3,414,719 | 12/1968 | Petzold | 235—92 |

MAYNARD R. WILBUR, Primary Examiner

R. F. GNUSE, Assistant Examiner

U.S. Cl. X.R.

307—222; 328—44, 48